July 4, 1944.　　　J. M. RILLER　　　2,352,973
OPHTHALMIC MOUNTING
Filed Oct. 6, 1941　　　2 Sheets-Sheet 1
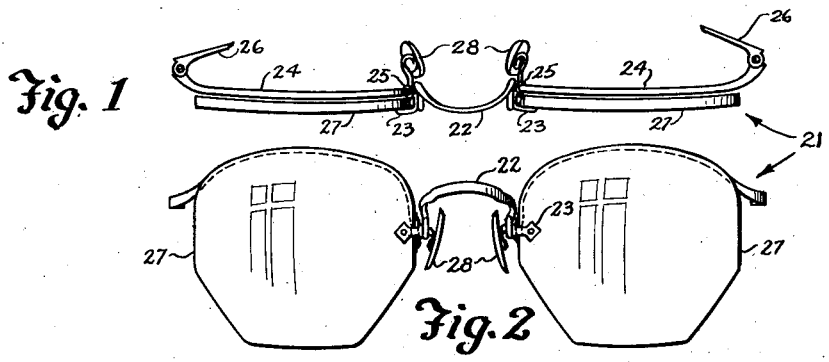
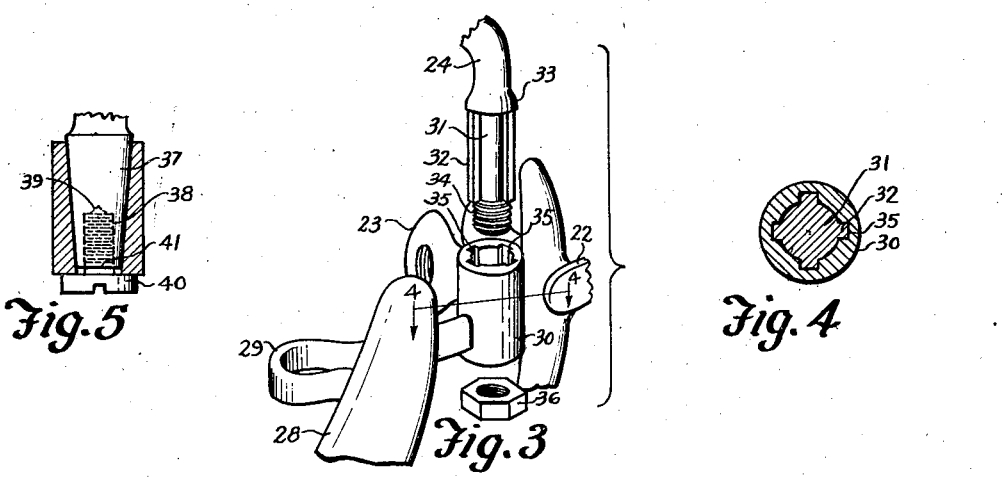
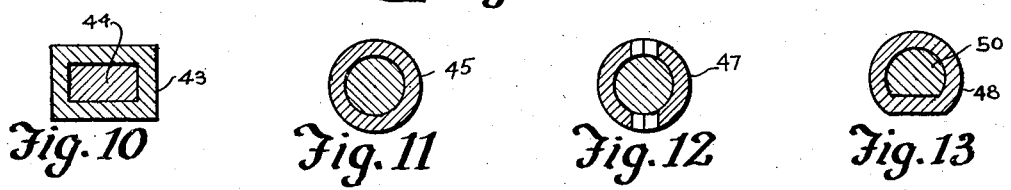
INVENTOR
Joseph M. Riller
BY
ATTORNEY INVENTOR
Joseph M. Riller
BY
Louis L. Gagnon
ATTORNEY Patented July 4, 1944

2,352,973

UNITED STATES PATENT OFFICE 2,352,973

OPHTHALMIC MOUNTING

Joseph Mathias Riller, Lake Orion, Mich., assignor to American Optical Company, Southbridge, Mass., a voluntary association of Massachusetts Application October 6, 1941, Serial No. 413,823

3 Claims. (Cl. 88—41)

This invention pertains to ophthalmic mountings and more particularly to a novel construction and arrangement of parts. Heretofore, the ophthalmic mountings which utilized a long and slender temple support of the type set forth herein, generally employed a temple support which was permanently affixed to the lens supporting structure or else provided a removable means utilizing a pin, screw, or similar element means in conjunction with other parts for securing the temple support to the lens supporting structure.

The present invention provides an interchangeable temple support which has means adjacent the lens supporting structure to provide against rotational movement of the temple support in relation to the lens supporting structure. The means for preventing rotational movement is a definite locking mechanism utilizing interengaging parts having locking means thereon which engage the complemental members to eliminate rotation or displacement of the temple support from its normal position. The locking mechanism may be means longitudinally disposed on one end of the long and slender temple support, which longitudinal means may be a key-like member which engages a key-way portion carried by a box of the lens supporting structure.

The antirotational means, further, may be any preshaped means longitudinally disposed adjacent one end of the long and slender temple support to engage a complemental preshaped portion which is securely affixed to the lens supporting structure. Further, the antirotational means may have an inclined surface such as the frustum of a cone or other shaped tapered portion, which may engage a corresponding complemental member which is carried by a box of the lens supporting structure, said complemental member being adapted to receive the preshaped portion of the long and slender temple support to provide a positive locking either by interengagement of the irregular surfaces or by frictional means.

With the exception of wedging, or inclined surfaces for frictionally preventing rotation, the locking means generally is a specific locking portion adjacent one end of the long and slender temple support which engages a complemental member having a portion for interengaging the locking portion of the long and slender temple support, while said complemental member is secured adjacent the lens supporting structure.

It is therefore an object of this invention to provide an ophthalmic mounting having a novel locking means for preventing rotation of the temple support in relation to the remainder of the ophthalmic mounting.

It is a further object of the invention to provide a temple support having means longitudinally disposed thereon for engagement with a complemental member of the ophthalmic mounting.

It is a further object of the invention to provide novel means for frictionally securing the long and slender temple support to the ophthalmic mounting to prevent rotation of said temple support when the ophthalmic mounting is in normal position of use on the face of the wearer.

A further object is to provide a definite locking means for preventing rotation of the temple support, said locking means utilizing also a securing means for holding the locking means in interengagement with one another.

A further object of the invention is to provide an antirotational temple support having means on said temple support for engagement with a complemental temple box or connecting portion, which temple box or connecting portion may have any desirable external cross sectional shape regardless of the internal cross sectional shape, so that the temple box may be adapted for use in securing other portions of the lens supporting structure thereto.

While certain specific objects have been herein set forth, it is to be understood that other objects may be and become apparent to those skilled in the art by a perusal of the disclosure herein and the subjoined claims.

It is to be understood that the specific showings herein are preferential and that modifications and equivalents may be made without departing from the invention and the spirit of the claims annexed hereto.

In the drawings:

Fig. 1 is a top view of the ophthalmic mounting with the temples partially broken away.

Fig. 2 is a front view of Fig. 1.

Fig. 3 is an enlarged view of one arrangement of the locking means of the temple support positioned for engagement with the temple support box and other parts of the lens supporting structure.

Fig. 4 is a sectional view taken along lines 4—4 of Fig. 3 to show the cross sectional outline of the temple locking means.

Fig. 5 is a partial sectional view showing a modification of means for securing the temple support against longitudinal movement.

Figs. 6, 7, 8, and 9 are modifications shown partially in section of the various longitudinal shapes and a locking means for preventing rotational movement of the temple support with respect to its complemental box.

Figs. 10, 11, 12, and 13 are cross sectional views taken substantially along lines 10—10, 11—11, 12—12, and 13—13 of Figs. 6, 7, 8, and 9 respectively.

Figure 14:
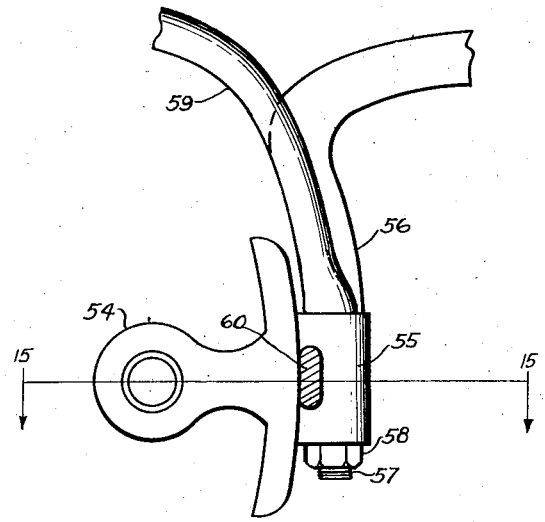

Fig. 14 is an enlarged rear view of the lens strap, bridge, temple box and temple support in a preferred arrangement.

Figure 15:
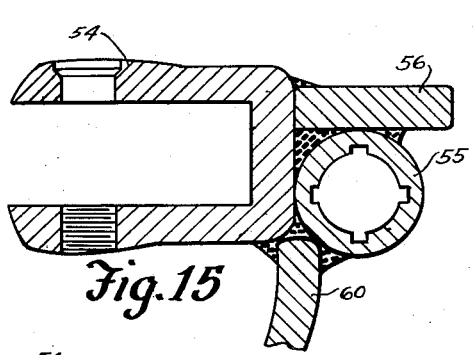

Fig. 15 is a cross sectional view taken substantially along lines 15—15 of Fig. 14.

Figs. 16, 17, 18, and 19 are cross sectional views, certain of which are partially broken away to show modification of arrangements of parts, which may be considered taken substantially along lines 15—15 of Fig. 14 when the proper parts and arrangements thereof are used in conformance with the modifications.

Figure 20:

Fig. 20 is a modification of a tapered temple support so formed as to provide an arm shape approaching a taper for having the unit stress at any point thereof substantially constant.

Referring to the drawings and more particularly to Figs. 1 and 2, an ophthalmic mounting 21 has a bridge 22 connected to lens straps 23, long and slender temple supports 24 having their nasal ends terminating in boxes 25 with their free outer ends pivotally connected to the temples 26, a pair of lenses 27 are connected to the lens straps 23 in any conventional manner, with nose pads 28 also connected to the lens straps. It is to be understood that the arrangement of parts shown pictorially in Figs. 1 and 2 is merely representative of the invention, and the remaining views shown enlarged, define the invention in more particular detail.

Referring to Fig. 3, a lens strap 23 has a portions of the bridge 22 connected thereto with a nose pad 28 connected by a nose pad arm 29 to the connection box 30. The long and slender temple support 24 has an elongated body portion 31 with flutes or longitudinally extending keys 32 exposed about the body portion 31 with a shoulder or hub portion 33 located on the upper part of the body portion with the threaded member 34 located at the free end of the body portion. Grooves 35 are located within the box and extend longitudinally therein being spaced equidistant from each other so that they form guide or locking means for the keys or longitudinal locking members 32. The keys 32 fit into the grooves 35 while the shoulder 33 engages the upper portion of the box 30 when the body portion 31 is properly fitted therein. A nut 36 has internal threads to engage the threaded portion 34 of the body portion 31 holding the long and slender temple support in locked position with the box 30. The lens strap 23, bridge 22, nose pad arm 29, and box 30 are all secured together by any convenient method, such as by soldering.

The cross sectional view shown in Fig. 4 clearly indicates that the body portion 31 has key members 32 which engage the key-ways 35 of the box 30 so that when the body portion is securely held in position by the nut 36 engaging the threaded portion 34, there will be no rotational movement of the body portion within the box.

While the views shown in Figs. 3, 6, 7, 8, and 9 disclose a body portion having an externally threaded protuberance thereon which engages a nut, such as 36, it is to be understood this is by way of illustration only and a modification is shown in Fig. 5 wherein the body portion 37 has an internal thread 38 and a screw 40. While the internal thread is shown only in the body member 37, it is pointed out that the same type of internal thread may be used in conjunction with any of the showings in Figs. 6, 7, 8, and 9 in lieu of the protruding thread portion 34. In the views Figs. 5, 6, 7, 8, and 9, it will be seen that the lower shoulder such as 41 is spaced from the lower face 42 of the box so that the nut 36, or the inner face of the screw 40 will be spaced from the shoulder 41 to permit the body portion, such as 31 of the long and slender temple support 24 to be held in longitudinal securement in relation to its respective box or connecting support.

Referring to Figs. 6 and 10, it will be noted that the box 43 has a rectangular outer cross sectional shape with substantially parallel sides while the body portion 44 is also of rectangular shape in the cross section shown but is tapered as is disclosed in Fig. 6. The upper portion of the body portion 44 may have a diameter greater than the greatest inside diameter of the box portion and may or may not have a specific shoulder thereon to act as a stop means, if necessary, limiting the possible longitudinal movement of the body portion 44 in relation to the nut 36.

Referring to Figs. 7 and 11, the box portion 45 is shown as round in a cross sectional view thereof with the body portion 46 also shown as round in a cross sectional view but being tapered, which body portion 46 may or may not have a shoulder thereon for the purposes set forth in relation to the corresponding shoulder as defined for Figs. 6 and 10. The shape of the body portion is substantially a frustum of a cone, which body portion engages the internal surface of the box 45, which surface is adapted to mechanically fit the tapered body portion 46. In Fig. 7, the body portion is tapered so that the downward pull of the body 46 by the nut 36 will cause sufficient friction between the body portion and the box to prevent rotation. In this manner the detachable, interchangeable long and slender temple support may have a rotational adjustment without changing the position of the box in relation to the lens supporting structure.

Referring to Figs. 8 and 9, it will be seen that the locking members are such, that once the boxes 47 and 48 of Figs. 8 and 9 respectively, are secured to the lens supporting structure, the body portions 49 and 50 are prevented from rotational movement due to their individual locking characteristics.

Figs. 8 and 12 show a protuberance 51 which engages a V-shaped slot in opposing sides of the box 47 and that a definite shoulder 52 is located on the upper part of the body portion 49 to limit movement of the body portion 49 within the box 47 by the nut 36. The shape and size of the protuberance 51, with its engaging V-shaped member is such that once the nut 36 is suitably tightened, there will be no rotation between the long and slender temple support 24 and the box 47.

Referring to Figs. 9 and 13, the cross sectional view of the body portion 50 is substantially D-shaped, that is one side of an approximately cylindrical body portion is flattened so that when it engages the complemental D-shaped inner surface of the box 48, there will be no rotation between the body portion 50 and the box 48. A shoulder 53 is provided on the upper part of the body portion 50 so that it will engage the upper surface of the box 48 to restrict downward longitudinal movement of the body portion 50 within the box 48, due to action of the nut 36.

While the various boxes shown herein have an outer cross sectional shape specifically shown in the respective views, it is to be understood that regardless of the internal shape of the boxes, the external shape may be of any desired configuration depending upon the use of the box in relation to other portions of the supporting structure which will be more clearly shown in other views.

The rear view shown in Fig. 14 shows a lens strap 54 which has a box or connection member 55 vertically disposed adjacent the outer surface of the lens strap, with a portion of the bridge 56 located in front of the box 55 with the long and slender temple support 59 having its body portion extending into the box 55 terminating in a threaded portion 57 to be gripped by a nut 58. A section of a nose pad arm 60 is shown extending rearwardly from the lens strap and the box 55. The various parts set forth in Fig. 14 may be secured to each other in any conventional manner such as by soldering, welding, or the like.

In Figs. 15 to 19 inclusive, the various lens straps, boxes, nose pad arms, and the bridges, are shown in various relations to one another to indicate a diversity of positioning of various parts. While the various positionings of the parts are shown in relation to boxes having definite shapes in the respective views, it is to be understood that the external and internal shapes of the boxes may be of any particular cross section desired depending upon the particular arrangement of parts used and the specific locking means employed with its respective box. In the various views of Figs. 15 to 19 inclusive, the lens strap 54 is substantially the same in each of the figures. Figs. 15, 17, 18, and 19 are shown with a box or temple support connecting means which is round in cross section, while Fig. 16 has a box which is substantially rectangular in an external cross section. Referring specifically to Fig. 15, the bridge 56 extends laterally from the lens strap 54 and has the box 55 on the edge of the lens strap with the nose pad arm 60 butt welded substantially centrally in the connection area adjacent the lens strap and the box 55.

Figure 16:
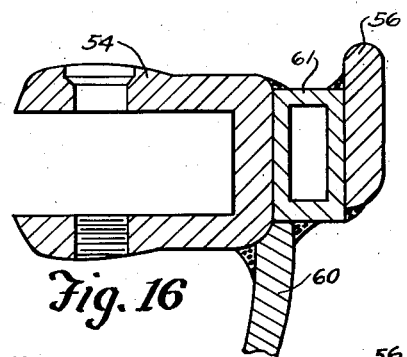

Fig. 16 has a rectangular box 61 which is adjacent the end of the lens strap 54 with the bridge 56 abutting one surface of the box 61, while the nose pad arm 60 is butt welded to the lens strap 54 and the box 61.

Figure 17:
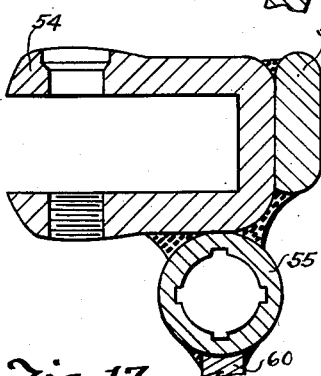

Fig. 17 shows the box 55 soldered to the rear surface of the lens strap while the bridge 56 is soldered to the end of the lens strap with the nose pad arm 60 being butt soldered to the rear surface of the box 55.

Figure 18:
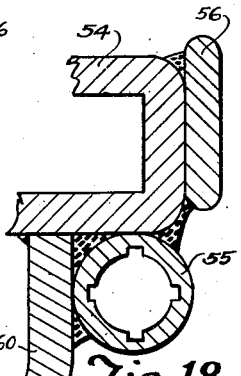

Fig. 18 shows the bridge 56 soldered with its flat portion against the end of the lens strap 54 while the box 55 is soldered to the rear of the lens strap with the nose pad arm 60 butt soldered to the rear of the lens strap 54 and against the side of the box 55.

Figure 19:
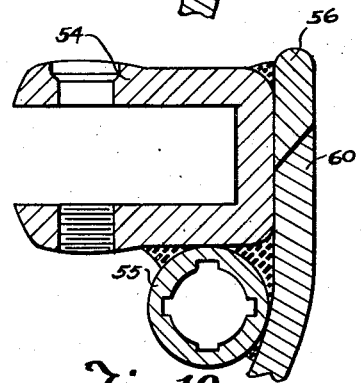

Fig. 19 shows the bridge abutting the end of the nose pad arm 60, both of which are soldered to the end of the lens strap 54, while the box 55 is located in the rear of the lens strap and soldered to the lens strap and the nose pad arm 60. The end of the pad arm and the adjacent side of the bridge are provided with angled overlapping portions.

The various views show modifications of location of parts and, recapitulating, various boxes may be used in the specific arrangements shown with said boxes being of different cross sectional shapes than those shown in the specific views.

Fig. 20 is a long and slender temple support which is in fact a tapered arm 62 which has a taper that approaches a taper which will substantially produce uniform strength, substantially between the shoulder 63 and a point adjacent the temple connection portion 64. The arm is so formed as to produce in effect a cantilever beam of uniform strength, the arm being so varied in cross section throughout its length that the unit stress at all points is substantially the same. The taper of the long and slender temple support is gradual from the shoulder 63, to substantially a portion adjacent the temple connection area 64. This type of temple support shown in Fig. 20 may be used in the ophthalmic mounting as well as the type of temple support shown in Fig. 1 which may be of substantially uniform cross section throughout its length.

It is to be understood that in any of the constructions shown and described the intent is that the arms 24 or 62, as the case may be, are to be rigidly held against sidewise displacement or looseness when once drawn into interlocked relation with the box support by the nut 36 or the screw 40 or a similar arrangement. The main idea is to provide interchangeable arms whereby arms of varied lengths may be employed with bridges of various different sizes as required by different individuals as well as lenses of different sizes for said individuals. The connections between the box and arm, in all instances, are such as to provide a positive mechanical locking connection therebetween which is permanently maintained during the use of the mounting whereby the arm or temple supports in all instances will be rigidly held against any sidewise play or movement. The assembly is so formed that when the connection ends of the arms are placed inwardly of the box members they may be drawn into mechanically locking binding relation by means of the screws 40 or nuts 36.

In forming the construction illustrated in Figs. 6 and 10 the end which fits within the box 43 may be formed of parallel surfaces and the said box likewise formed with parallel surfaces. The parts are placed in this assembled relation and the sides of the box are then struck to cause them to be angularly disposed as illustrated in Fig. 6 and to simultaneously cause the end internally of the box to be tapered to a snug fit internally of the box or all of the parts may be preshaped with said tapers. In the construction in Figs. 9 and 13 the end 50 of the arm may be fitted into the box 48 and the side of the box struck to cause it to flatten and to simultaneously cause the end 50 to flatten or the parts may be preformed to said shape. It is to be understood that positive locking means, such as shown at 51, or a flattened surface such as shown in Figs. 9 and 13 may be embodied in the construction illustrated in Fig. 7 if desired in which instance the body simulating the portions 49 and 50 lying within the box would have a taper. Likewise the body portion 31 of the arm 24 in the construction illustrated in Fig. 3 and the box 30 may be provided with interfitting tapered surfaces.

The construction is distinctive in that the arm and box are so formed as to have a positive inter-binding relation with each other when assembled and will tend to retain this relation independently of additional attaching or securing means and the securing means either in the form of a nut 36 or screw 40 or other means merely functions to retain the arms and boxes in said inter-binding relation with each other.

By this it is meant that the parts do not depend solely upon the nuts, screws, or the like, in obtaining a mechanically interfitting or binding relation with each other. It is true that the nuts or screws aid in drawing the parts into positive interbinding relation with each other and maintaining said relation but they are not depended upon solely for this purpose as the interfitting parts of the arms and the boxes of the various constructions disclosed will remove any tendency of looseness and play between the parts and will rigidly associate the parts independently of the connecting or securing means.

From the foregoing, it will be seen that longitudinal locking means may be provided adjacent one end of the temple support so that a complemental locking member may interengage the locking portions of the temple support. Various cross sectional characteristics may be injected into the invention other than those presented herein and various forms and modifications may be utilized within the spirit of the subjoined claims.

Having described my invention, I claim:

1. An ophthalmic mounting comprising a pair of lenses each having a connection opening on the nasal side thereof, a bridge member, lens straps secured to said bridge member, each of said straps having a perforated ear adapted to be connected with the lens by means extending through the perforation in the ear and the connection opening in the lens, each of said straps having a relatively short tubular member secured to the rear thereof, nose pad supporting arms each having a surface portion connected with one of said respective tubular members with said arms extending rearwardly to a nose pad connection, long and slender temple supports shaped throughout the major portion of the lengths thereof to follow substantially the shape of the upper contour shape of the lenses, each of said temple supports having a temporal end portion terminating in a temple pivotal connection and having an attachment end connected with a respective tubular member, said attachment end and said tubular member having portions in telescoped relation with each other and each having engaging surface portions for limiting said telescoping movement and interlocking means for preventing rotational movement of said temple support relative to the tubular member, each of said attachment ends of the long and slender temple supports having a relatively short threaded portion protruding outwardly of the tubular member when the engaging surface portions for limiting the telescoping movement are in engaged relation with each other and a nut threadedly connected with said relatively short threaded portion of the temple support and having a surface portion engaging the adjacent end of the tube whereby binding force exerted on said nut will cause the engaging surface portions of the temple support and the tubular member, as well as the interlocking means, to be held in binding relation with each other for rigidly connecting the parts and for permanently supporting the long and slender temple support in proper relation with the lens, said tubular member, the connection end of the long and slender temple support and the binding nut all being located in the rear of the lens strap and being substantially concealed from view when the mounting is viewed from the front.

2. An ophthalmic mounting comprising a pair of lenses each having a connection opening on the nasal side thereof, a bridge member, lens straps secured to said bridge member, each of said straps having a perforated ear adapted to be connected with the lens by means extending through the perforation in the ear and the connection opening in the lens, each of said straps having a relatively short tubular member secured to the rear thereof, nose pad supporting arms each having a surface portion connected with one of said respective tubular members with said arms extending rearwardly to a nose pad connection, long and slender temple supports shaped throughout the major portion of the lengths thereof to follow substantially the shape of the upper contour shape of the lenses, each of said temple supports having a temporal end portion terminating in a temple pivotal connection and having an attachment end connected with a respective tubular member, said attachment end and said tubular member having portions in telescoped relation with each other and each having engaging surface portions for limiting said telescoping movement and interfitting tongue and groove means for preventing rotational movement of said temple support relative to the tubular member, each of said attachment ends of the long and slender temple supports having a relatively short threaded portion protruding outwardly of the tubular member when the engaging surface portions for limiting the telescoping movement are in engaged relation with each other and a nut threadedly connected with said relatively short threaded portion of the temple support and having a surface portion engaging the adjacent end of the tube whereby binding force exerted on said nut will cause the engaging surface portions of the temple support and the tubular member, as well as the tongue and groove means to be held in binding relation with each other for rigidly connecting the parts and for permanently supporting the long and slender temple support in proper relation with the lens, said tubular member, the connection end of the long and slender temple support and the binding nut all being located in the rear of the lens strap and being substantially concealed from view when the mounting is viewed from the front.

3. An ophthalmic mounting comprising a pair of lenses each having a connection opening on the nasal side thereof, a bridge member, lens straps secured to said bridge member, each of said straps having a perforated ear adapted to be connected with the lens by means extending through the perforation in the ear and the connection opening in the lens, each of said straps having a relatively short tubular member secured to the rear thereof, nose pads supporting arms each having a surface portion connected with one of said respective tubular members with said arms extending rearwardly to a nose pad connection, long and slender temple supports shaped throughout the major portion of the lengths thereof to follow substantially the shape of the upper contour shape of the lenses, each of said temple supports having a temporal end portion terminating in a temple pivotal connection and having an attachment end connected with a respective tubular member, said attachment end and said tubular member having portions in telescoped relation with each other with the said attachment end having an enlarged portion for engaging the upper end of the tube to limit said telescoping movement and said attachment end having an irregular contour and said tubular member being shaped to said irregular contour for preventing rotational movement of said temple support relative to the tubular member, each of said attachment ends of the long and slender temple supports having a relatively short threaded portion protruding outwardly of the tubular member when the enlarged portion is in engaged relation with the tube for limiting the telescoping movement and a nut threadedly connected with said relatively short threaded portion and having a surface portion engaging the adjacent lower end of the tube whereby binding force exerted on said nut will cause the enlarged portion and tube as well as the irregular contours to be held in binding relation with each other for rigidly connecting the parts and for permanently supporting the long and slender temple support in proper relation with the lens, said tubular member, the connection end of the long and slender temple support and the binding nut all being located in the rear of the lens strap and being substantially concealed from view when the mounting is viewed from the front.

JOSEPH MATHIAS RILLER.